United States Patent [19]

Tateishi et al.

[11] Patent Number: 5,056,074
[45] Date of Patent: Oct. 8, 1991

[54] TRACKING SERVO SYSTEM WITH A VARIABLE EQUALIZING CHARACTERISTIC

[75] Inventors: Kiyoshi Tateishi; Haruyasu Sakata, both of Tokorozawa, Japan

[73] Assignee: Pioneer Electronic Corporation, Tokyo, Japan

[21] Appl. No.: 334,443

[22] Filed: Apr. 7, 1989

[30] Foreign Application Priority Data

Sep. 13, 1988 [JP] Japan .................. 63-229329

[51] Int. Cl.⁵ .................. G11B 7/095; G11B 21/08
[52] U.S. Cl. .................. 369/44.28; 369/30; 358/907
[58] Field of Search .............. 369/44.28, 44.29, 44.35, 369/44.25, 124, 32, 30; 358/907

[56] References Cited

U.S. PATENT DOCUMENTS 4,817,073  3/1989  Suzuki .................. 369/44.28

Primary Examiner—Roy N. Envall, Jr.
Assistant Examiner—Thang V. Tran
Attorney, Agent, or Firm—Foley & Lardener

[57] ABSTRACT

A tracking servo system for use in a disc player having a pickup, for playing an information recording disc having a recording track, the tracking servo system comprises an equalizing circuit for compensating for the frequency characteristic of the tracking error signal for the tracking servo operation, the equalizing circuit means performing a compensating operation in accordance with a predetermined compensation characteristic during a normal playback of the recording disc. The system is provided with a control device for varying coefficients determining the compensation characteristic of the equalizing circuit so that the compensation characteristic has a phase margin in a middle frequency range larger than a corresponding phase margin in the predetermined compensation characteristic upon closure of the tracking servo loop, and a middle frequency gain of the equalizing circuit means is gradually increased with time until the compensation characteristic equals the predetermined compensation characteristic when a predetermined time period elapses.

4 Claims, 7 Drawing Sheets

TRACKING SERVO SYSTEM WITH A VARIABLE EQUALIZING CHARACTERISTIC

BACKGROUND OF THE INVENTION

1. Field of the Invention

The present invention relates to a tracking servo system for use in an information recording disc playing apparatus. Apparatuses for playing an information recording disc, such as a video disc or a digital audio disc, must inevitably be provided with the tracking servo system for controlling the position of an information reading light spot of the pickup so that it accurately follows the recording track irrespective of the eccentricity of the disc, for example.

This tracking servo system constitutes the so-called closed loop system which generates a tracking error signal corresponding to the amount of deviation of the information reading light spot with respect to the recording track of the disc in a disc's radial direction, and performing position control relative to the recording track by driving an actuator for moving the information reading light spot in the radial direction in response to the tracking error signal. Furthermore, in the case of such a servo system, the servo loop is opened during the so-called jump operation for jumping recording track(s), and a jump pulse(s) is are applied to the actuator while the servo loop is opened, and afterwards the servo loop is closed at a predetermined timing so as to lead in the servo loop.

On the other hand, in the tracking servo system, an equalizer capable of performing a proportional-integral and differential (PID) operation, is generally provided in the servo loop, so that the servo system is stabilized by compensating the frequency characteristic of the tracking error signal by means of this equalizer. More specifically, during the normal playing operation a gain boost compensation is performed for the low frequency range of the total open loop characteristic by means of this equalizer. With this feature, the followability of the pickup is improved against the disc eccentricity component.

Since there is a correlation between the gain characteristic and the phase characteristic in the total open-loop characteristic of this equalizer, the phase characteristic becomes such that there is a phase inversion in the middle frequency range (about 1 KHz) as a result of a gain boost compensation effected in the low frequency range.

Now, the lock-in process of the servo loop after a jump operation will be described. Since the frequency of the jump operation is 1 through 2 KHz, a good phase characteristic around 1 KHz is required with respect to the servo characteristic. However, there is an inversion of the phase characteristic in the middle range as mentioned above, and the lock-in of the servo loop occurs while an acceleration action is working on the actuator. As a result, the overshoot becomes large, so that the lock-in process of the servo loop becomes unstable.

OBJECT AND SUMMARY OF THE INVENTION

The present invention has been made in view of the points described above, and an object of the present invention is to provide a tracking servo system with which the lock-in process is performed stably without errors.

In a tracking servo system according to the present invention, a coefficient for determining the characteristic of an equalizer, which compensates for the frequency characteristic of the tracking error signal in accordance with a predetermined characteristic during the normal playing operation, is made variable, and a control operation is performed so that the phase margin of the characteristic of the equalizer is larger in the middle frequency range than that of the predetermined characteristic immediately after the closing of the servo loop, and the gain in the middle frequency range gradually increases with time, and the characteristic of the equalizer reaches the predetermined characteristic after the elapse of a predetermined time period.

DETAILED DESCRIPTION OF A PREFERRED EMBODIMENT

The embodiment of the present invention will be discussed with reference to the accompanying drawings hereinafter.

Figure 1:
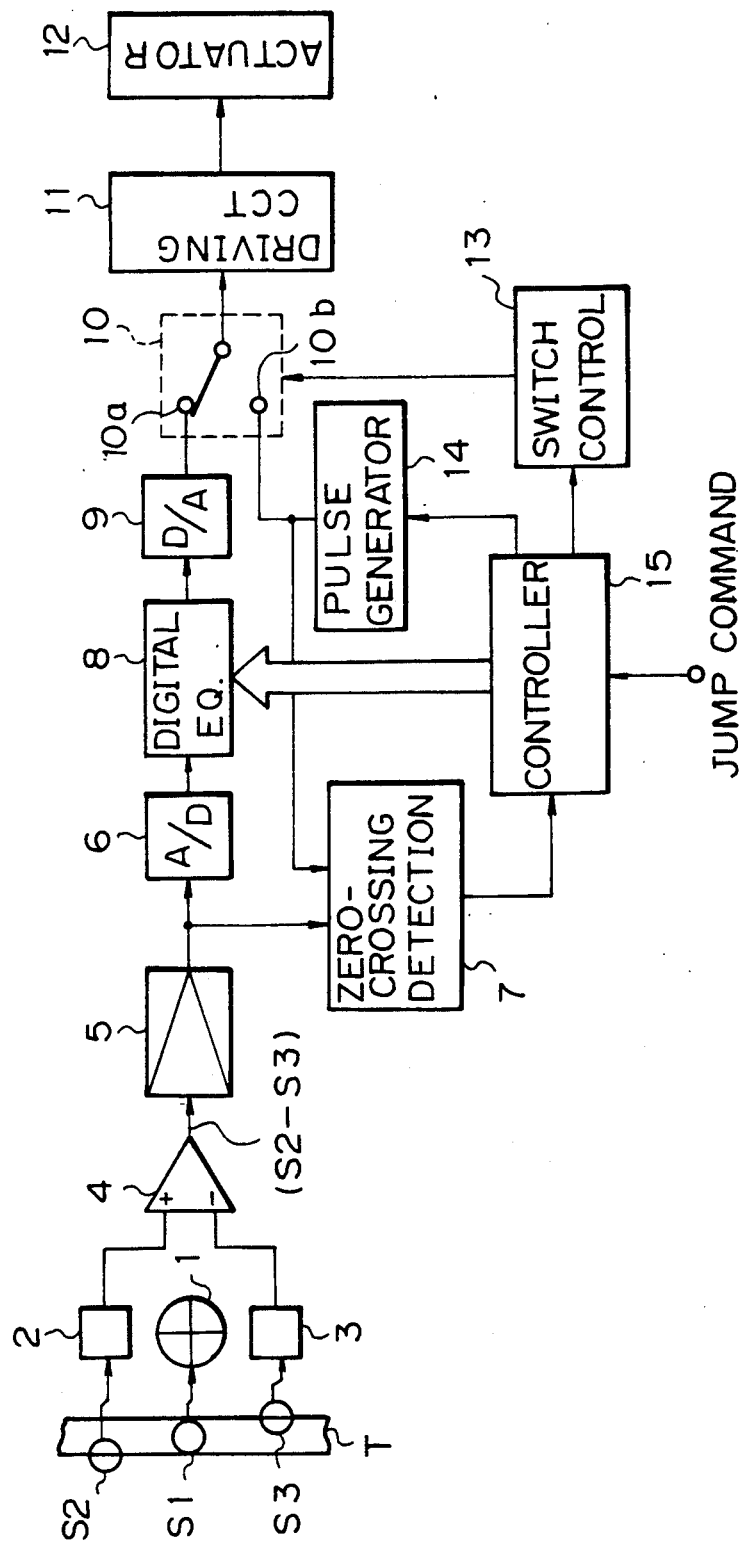
FIG. 1 is a block diagram showing an embodiment of the present invention.

FIG. 1 is a block diagram showing the embodiment of the tracking servo system according to the present invention. As shown, three beam spots obtained by converging a laser beam, that is, a recorded information reading spot S1, and a pair of spots S2 and S3 for detecting tracking information which precede or follow the spot S1 are irradiated from a pickup (not illustrated) on a recording track T of a disc in such a positional relationship as illustrated. Reflection lights of these beam spots are received by photo-electric transducers 1 through 3 which are incorporated in the pickup.

Figure 2A:
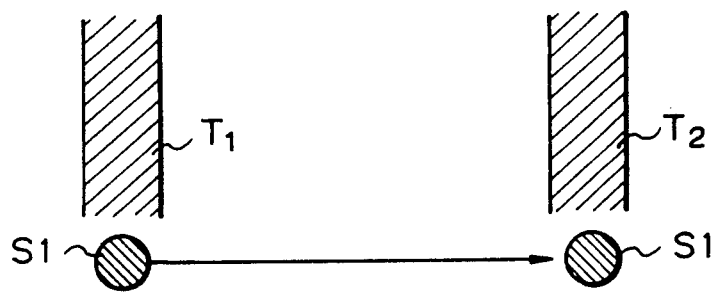
FIG. 2A and 2B are diagrams showing a relationship between the moving position of the information reading spot relative to the recording track and the tracking error signal.
Figure 2B:
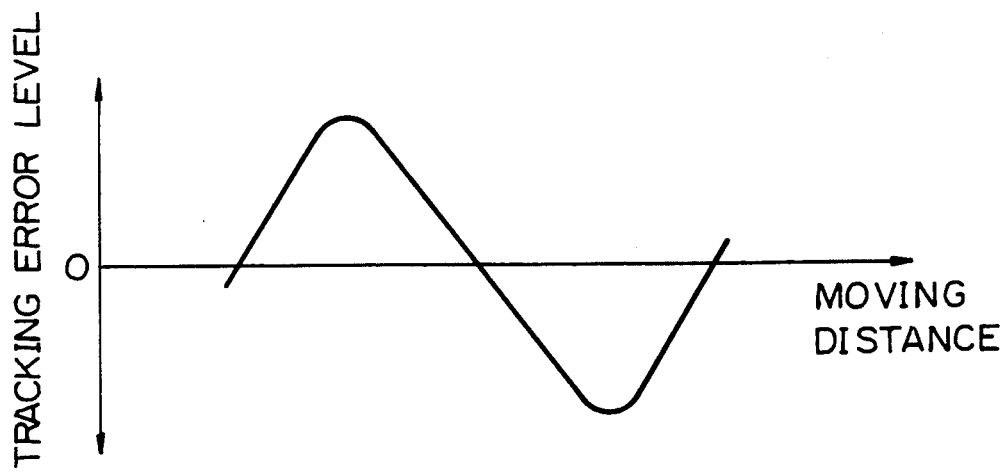

The photo-electric transducer 1 is made up of four light receiving elements which are arranged to be bounded by two lines crossing at right angles with each other, and are independent from each other. A sum total of output signals of these light receiving elements constitutes a read-out RF (radio frequency) signal. On the other hand, output signals of the pair of photoelectric transducers 2 and 3 are supplied to a differential amplifier 4 in which a difference between two output signals is derived, and the differential output signal (S2–S3) constitutes a tracking error signal. When the beam spots S1 through S3 are moved, by a jump operation, from one recording track T1 to the adjacent recording track T2 as illustrated in FIG. 2A, the tracking error signal (S2-S3) will have the sinusoidal waveform as illustrated in FIG. 2B, whose level is proportional to the amount of deviation of the information reading light spot S1 from the recording track T, and whose zero-crossing point corresponds to the position of the center of the recording track and the position of the central point between two adjacent tracks T1 and T2.

The tracking error signal is amplified by an error amplifier 5, and in turn supplied to an A/D (Analog to Digital) converter 6 and to a zero-crossing detection circuit 7. The tracking signal digitized at the A/D converter 6 is compensated for its frequency characteristic by means of a digital equalizer 8, and in turn converted into analog form by means of a D/A (Digital to Analog) converter. This analog signal is supplied to a close contact 10a of a loop switch 10. The output signal of the loop switch 10 is supplied to an actuator 12 of the pickup via a drive circuit 11. This actuator 12 is operative to move the information reading spot S1 in a direction of disc radius so that the spot S1 accurately follows the recording track T.

The circuits and elements described above together constitute a tracking servo loop.

The switch position of the loop switch 10 is controlled by means of a switch control circuit 13, and the servo loop is closed when the switch 10 is operated at its close contact 10a. In the open-loop state wherein the loop switch 10 is operated at its open contact 10b, a jump pulse and a break pulse which are opposite in polarity are issued from a pulse generator circuit 14, respectively at appropriate timings. The jump operation is performed by applying these pulses to the actuator 12. The timings of the generation of the jump pulse and the break pulse are controlled by means of a controller 15.

The zero-crossing circuit 7 is configured to detect the timing of zero-crossing of the tracking error signal turning from positive to negative during the jump operation, and to supply a detection output signal to the controller 15. The controller 15 is constituted by a microcomputer, and during the jump operation it supplies a timing signal for the change-over of the loop switch to the switch control circuit 13, and a timing signal for the generation of the jump pulse and break pulse to the pulse generator circuit 14 respectively, on the basis of a jump command supplied from outside and the detection output signal from the zero-crossing detection circuit 7.

Figure 3:
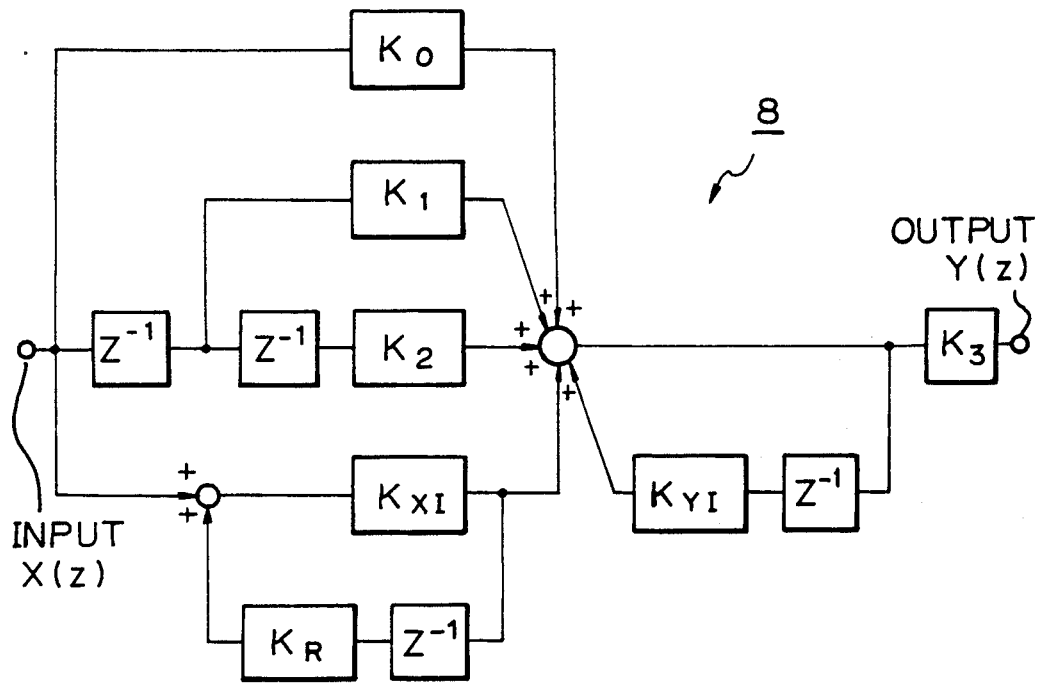
FIG. 3 is a block diagram showing an example of the digital equalizer shown in FIG. 1.

An example of the construction of the digital equalizer 8 is shown in FIG. 3. In this figure, $K_0$, $K_1$, $K_2$ respectively represent coefficients of zero-order, first-order, and second-order terms. Similarly, $K_{XI}$ represents the gain of an integration term (integration coefficient), $K_R$ and $K_{YI}$ represent low pass filters of cut-off frequencies of 20 Hz and 4 KHz respectively, and $K_3$ represents a gain. $Z^{-1}$ represents a sampled value of the previous time.

If we assume that an input signal and an output signal are denoted by $X(z)$ and $Y(z)$ respectively and the equalizing characteristic is denoted by $EQ(z)$, the relation between the input and output signals is expressed as:

$$Y(z) = EQ(z) \cdot X(z)$$

Furthermore, $$EQ(z) = K_3 \times \{1 - K_1 Z^{-1} + K_2 Z^{-2} + (K_{XI}/1 - K_R Z^{-1})\}/(1 - K_{YI} Z^{-1})$$

This digital equalizer is configured that the second-order term coefficient $K_2$ and the integration coefficient $K_{XI}$ which determine the characteristic of the equalizer are variable. During the normal playback operation, these coefficients are fixed at values for attaining a predetermined characteristic of the equalizer by which the gain boost compensation for the low frequency range is performed. At the time of the lock-in of the servo loop after a jump operation for example, these coefficients are varied by means of the controller 15 following the procedure which will be described later.

Figure 4:
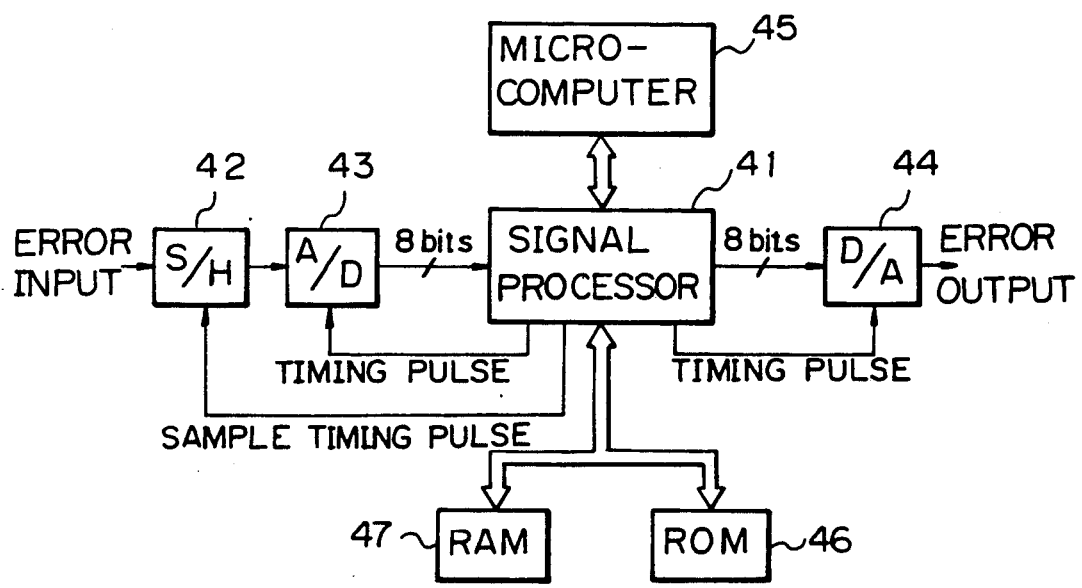
FIG. 4 is a block diagram showing the operation of the digital equalizer performed by a signal processor.

FIG. 4 is a block diagram showing a construction in which the function of the digital equalizer is executed by a signal processor 41. As shown in this figure, the input error signal is sampled by means of a sample and hold circuit 42, and in turn transformed into digital form by means of an A/D converter 43. Thus, the error signal is supplied to the signal processor 41 as 8-bit data, for example. The signal processor 41 is controlled by means of a microcomputer 45 so that it performs the compensation of frequency characteristic to the tracking error signal. From this signal processor 41, a sample timing pulse signal, an A/D conversion timing pulse signal, and a D/A conversion timing pulse signal are supplied to the sample and hold circuit 42, the A/D converting circuit 43, and to the D/A converting circuit 44, respectively. The 8-bit data whose frequency characteristic is compensated by the signal processor 41 is converted to an analog signal at the D/A converting circuit 44, to provide an error signal output. In a ROM 46, predetermined data are stored previously, and data obtained through the calculation operation are temporarily stored in a RAM 47.

Figure 5:
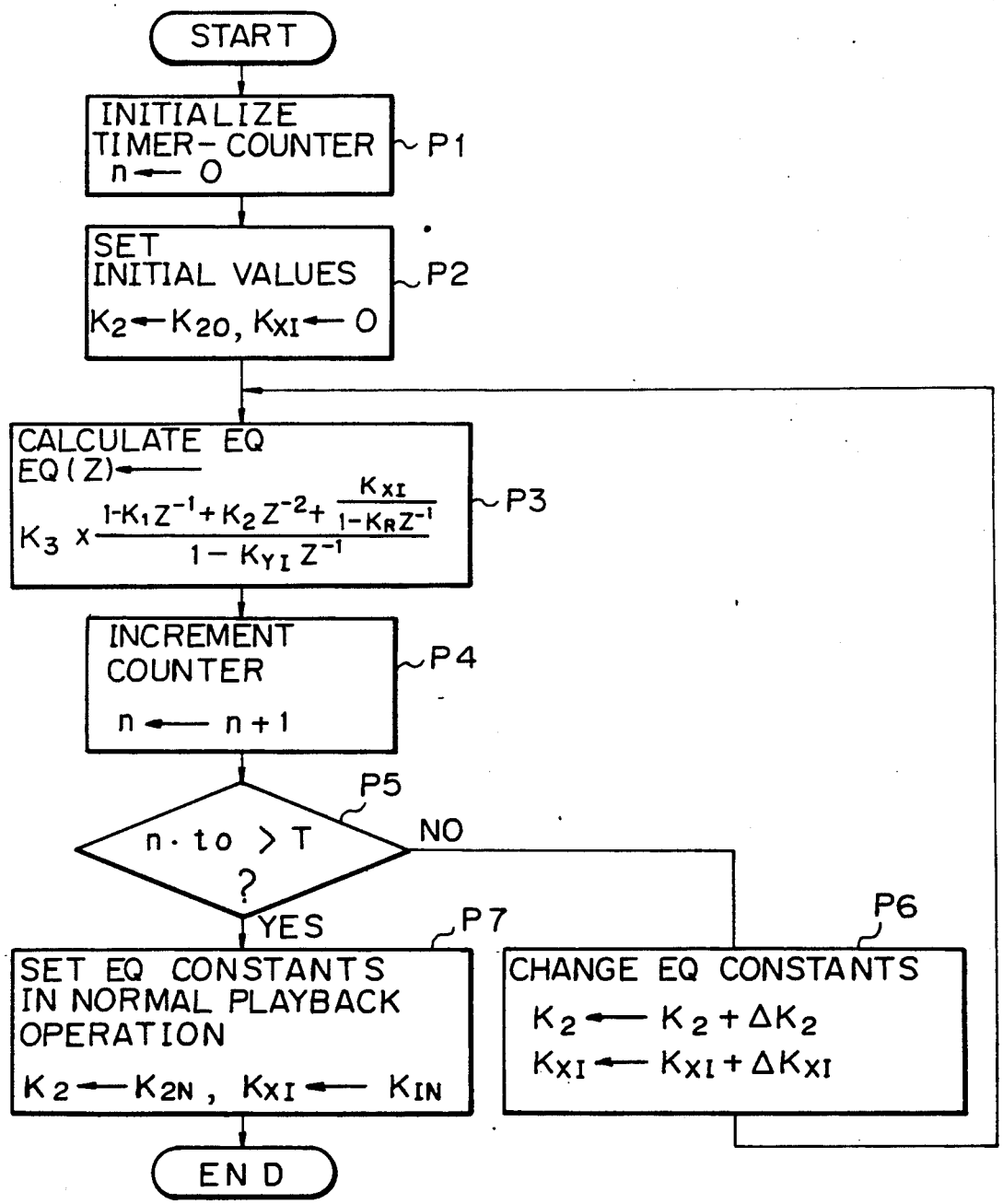
FIG. 5 is a flowchart showing the control process for determining the second-order term coefficient $K_2$ and for determining the integration coefficient $K_{XI}$ during the lock-in process.

Referring to the flowchart of FIG. 5, the control procedure of the second-order term coefficient $K_2$ and the integral term coefficient $K_{XI}$ will be explained hereinafter.

This subroutine is called for execution at the timing of the closing of the servo loop which takes place upon completion of a single jump operation, a scanning operation, or a search operation, or upon power-up of the system by starting the power supply.

The processor at first resets the count value of an internal timer-counter (step P1) in order to measure the time period taken for the locking-in of the servo loop. Subsequently, the processor sets an initial value $K_{20}$ and a value 0 for the second-order term coefficient $K_2$ and the integration coefficient $K_{XI}$ (step P2) respectively. Then, the processor performs the compensation of frequency characteristic to the tracking error signal (step P3) by executing the calculation of EG(z) on the basis of the initial values of the second-order term coefficient and the integration coefficient $K_{XI}$ and another coefficient (a fixed value) which is set previously.

Figure 6:
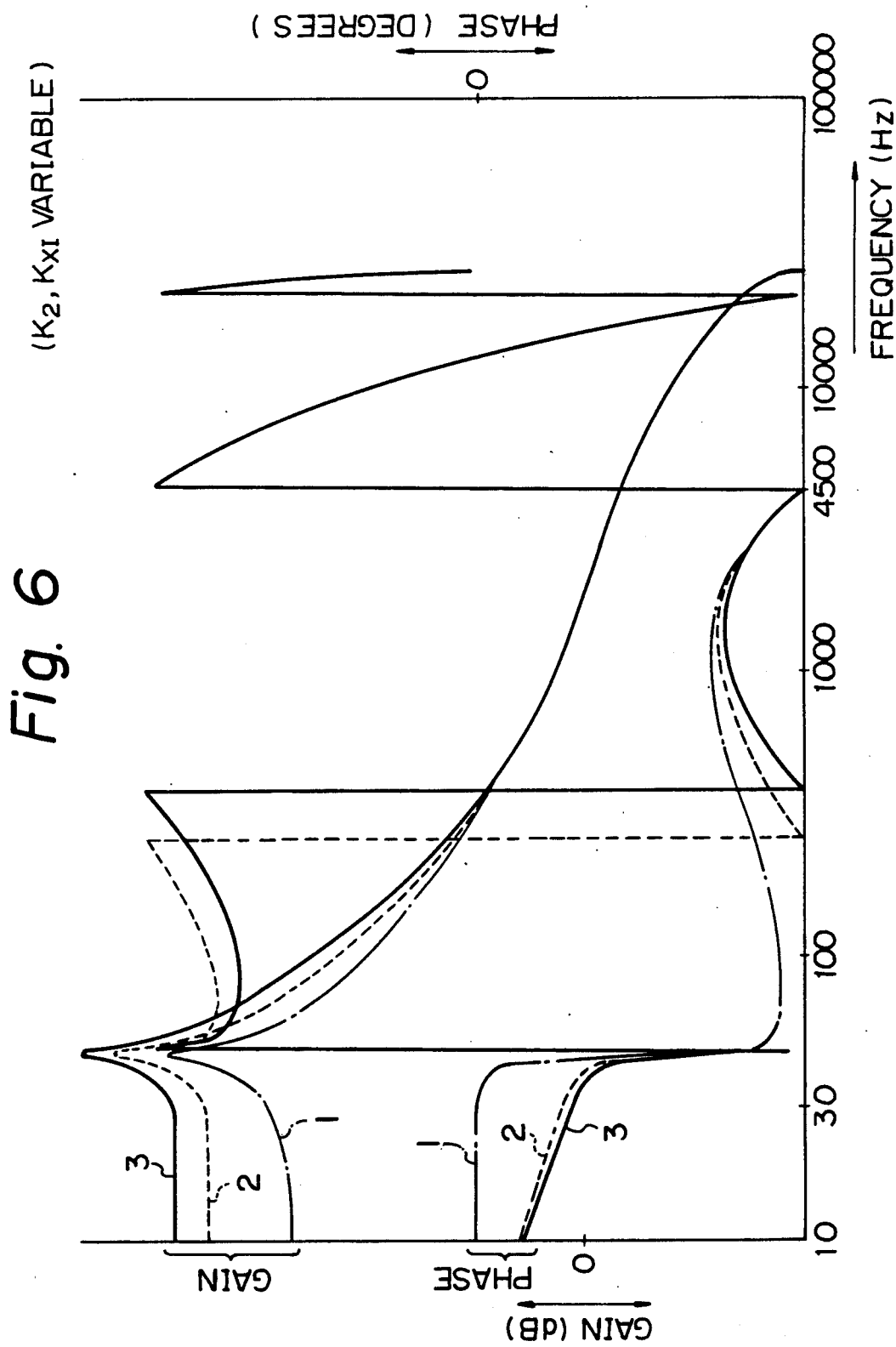
FIG. 6 is a diagram showing overall open-loop characteristics obtained when the second-order term coefficient $k_2$ and the integration coefficient $K_{XI}$ are varied.

An over-all open loop characteristic upon starting the lock-in operation, which is determined by initial values of the second-order term coefficient $K_2$ and the integration coefficient $K_{XI}$, is a characteristic such as shown by the one dot chain line ① in FIG. 6, which has a large phase margin in the middle frequency range (about 100 Hz) although the gain in the middle range is reduced. This characteristic has a relatively small peak, and it is a characteristic directly before the response characteristic at the time of the closing of the servo loop drops.

After the calculation of EG(z), the count value n of the timer counter is incremented (step P4). Since the time period elapsed after the start of the lock-in operation can be determined by n·$t_0$ where $t_0$ is the period of execution cycle (for example, the sampling period of the equalizer 8), processor then judges as to whether or not the elapsed time n·t₀ has exceeded a predetermined lock-in time T (step P5). If the lock-in time T has not been exceeded, the processor increases the values of the second-order coefficient $K_2$ and the integration coefficient $K_{XI}$ by $\Delta K_2$ and $\Delta K_{XI}$ (step P6), then goes back to step P3, to calculate EG(z) using the values of $K_2$ and $K_{XI}$ which have been varied. These operations are repeated until it is judged, in step P5, that the elapsed time n·t₀ has exceeded the lock-in time period T. In short, the values of the second-order term coefficient $K_2$ and the integration coefficient $K_{XI}$ are varied by $\Delta K_2$ and $\Delta K_{XI}$ every cyclic period $t_0$, and the overall open-loop characteristic shown in FIG. 6 varies in response to the variation in these coefficients. The dashed line ② shows the characteristic in the middle stage of the lock-in operation.

When it is judged, in step P5, that the lock-in time T has been exceeded, then the processor operates to set the values of the second-order term coefficient $K_2$ and the integration coefficient $K_{XI}$ to be equal to the values $K_{2N}$ and $K_{IN}$ in the normal playback operation (step P7). The overall open-loop characteristic determined by the values $K_{2N}$ and $K_{IN}$ is, as indicated by the solid line ③ in FIG. 6, such a characteristic in which the gain is increased in the low frequency range (below 30 Hz) and the middle frequency range (around 100 Hz).

As explained in the foregoing, the values of the second-order term coefficient $K_2$ and the integration coefficient $K_{XI}$ are varied so that the characteristic of the equalizer 8 is such that the phase margin becomes large in the middle range at the start time of the lock-in operation, then the gain in the middle frequency range is gradually increased with time and the characteristic returns to the characteristic in the normal playback operation when the lock-in time T has been exceeded. With this feature, although the gain in the middle range is sacrificed the beginning of the lock-in operation, it becomes possible to reduce the overshoot in the lock-in operation, so that the lock-in operation is performed stably without any error. Moreover, after the operation of the servo loop has entered in the stable state, the gain is increased in the low and middle frequency ranges, so that a sufficient error suppressing characteristic is obtained. Therefore, the followability against the eccentricity of the disc is greatly improved.

Figure 7:
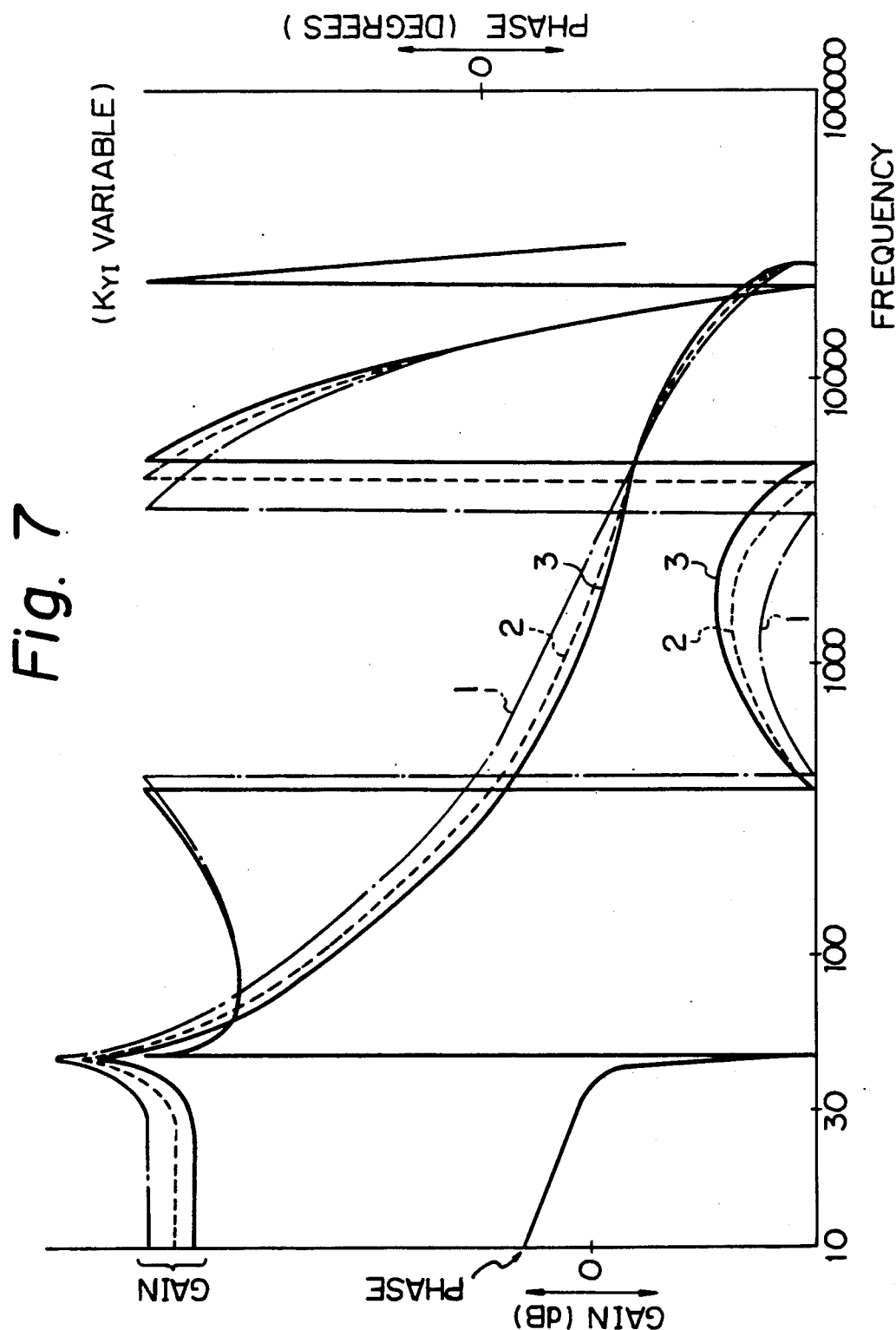
FIG. 7 is a diagram showing overall open-loop characteristics obtained when the denominator first-order term $K_{YI}$ is varied.

With respect to the overall open-loop characteristic shown in FIG. 6, it is conceivable to directly switch from the characteristic ① at the beginning of the lock-in operation to the characteristic ③ in the normal playback operation. However, if the characteristic is switched suddenly, a switching shock is inevitably produced, so that the signal in the drive circuit 11 of the actuator 12 will contain noises at the timing of switching, which in turn will result in the generation of disturbance to the lock-in operation. Therefore, as in the case of the embodiment described above, it is essential to change the characteristic gradually from the characteristic ① for the start of the lock-in operation to the characteristic ③ for the normal playback operation. Furthermore, the effect described above is obtained by varying the value of the second-order term coefficient and the integration coefficient among coefficients determining the characteristic of the equalizer 8. If another coefficient such as the value of the denominator first-order term $K_{YI}$ is varied, an inversion of phase occurs in the middle frequency range in the characteristic ① for the start time of the lock-in operation as will be understood from the overall open-loop characteristic shown in FIG. 7. Thus, it is not possible to suppress the overshoot, and it will cause the fluctuation of the gain at the frequency about 1 KHz.

In the case of the embodiment described above, the values of the second-order term coefficient $K_2$ and the integration coefficient $K_{XI}$ are varied by constant values $\Delta K_2$ and $\Delta K_{XI}$ every one cycle through the lock-in time T. However, it is also possible to divide the lock-in time T into a plurality of periods, and to change the amount of variation in each cycle among the plurality of periods.

Figure 8:
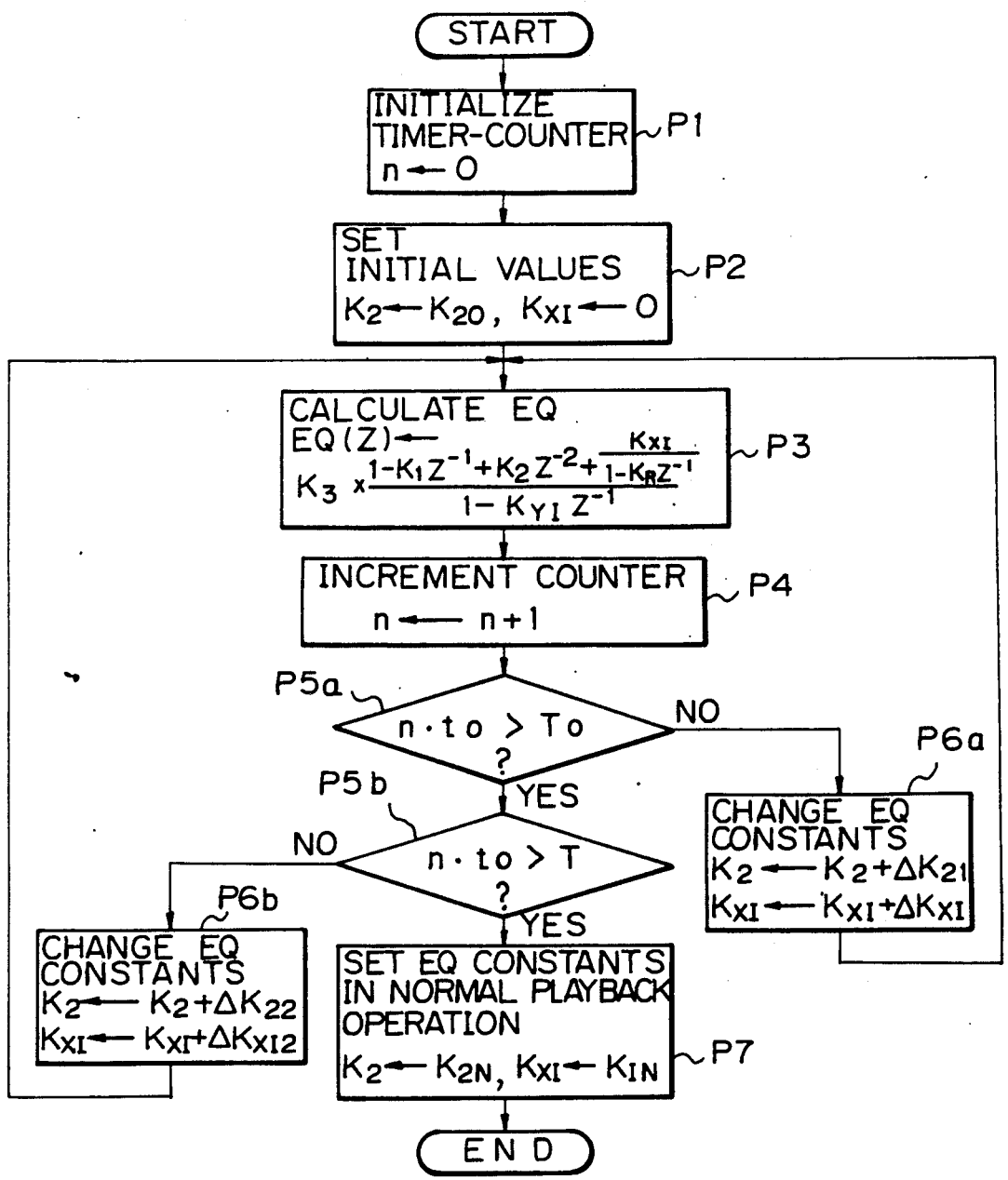
FIG. 8 is a flowchart showing a control procedure when the lock-in time period is divided into two periods.

FIG. 8 shows a procedure in a case where the lock-in time T is divided into two periods $T_0$ and $T-T_0$. In the first period $T_0$, the coefficient values are varied by values $\Delta K_{21}$ and $\Delta K_{XI1}$ (steps P5a and P6a), and the coefficient values are varied by values $\Delta K_{22}$ ($\Delta K_{22} > \Delta K_{21}$) and $\Delta K_{XI2}$ ($\Delta K_{XI2} > \Delta K_{XI1}$) is the second period $T-T_0$ (steps P5b and P6b).

In view of the foregoing description, it will be appreciated that, according to the present invention, the coefficients determining the characteristic of the equalizer are varied so that the characteristic of the equalizer becomes such that a large phase margin in the middle frequency range is obtained upon closure of the servo loop after the jump operation, that is, at the beginning of the lock-in operation, then the gain in the middle frequency range is gradually increased with time, and the characteristic returns to the characteristic in the normal playback operation when the time period of the lock-in operation has elapsed. Thus, it is enabled to obtain the characteristic in which the phase margin in the middle frequency range is sufficiently large at the initial stage of the lock-in operation, so that the overshoot in the lock-in operation can be suppressed to be small. Therefore, the lock-in operation is surely performed in a stable manner. Moreover, after the servo operation has entered in a stable state, the gain in the low and middle frequency ranges is increased so that a sufficient error suppressing effect is obtained. In this way, the followability of the servo system against the eccentricity of the disc is improved.

What is claimed is:

1. A tracking servo system for use in a disc player having a pickup, for playing an information recording disc having a recording track, said tracking servo system comprising:

means for generating a tracking error signal corresponding to an amount of deviation, in a radial direction of said disc, of an information reading spot of said pickup with respect to said recording track, an equalizing circuit means for compensating for a frequency characteristic of said tracking error signal, said equalizing circuit means performing a compensation operation in accordance with a predetermined compensation characteristic during a normal playback of said disc;

a driving means for shifting said information reading spot in said radial direction of disc in response to said tracking error signal passed through said equalizing circuit means; and a servo loop switch adapted to open in response to a jump command signal generated in said disc player, and to close at a predetermined timing in a period of a jump operation, wherein coefficients determining predetermined compensation characteristic of said equalizing circuit means are made variable, and said tracking servo system is provided with a control means for varying said coefficients so that said compensation characteristic has a phase margin in a middle frequency range larger than a corresponding phase margin in said predetermined compensation characteristic at said predetermined timing, and a middle frequency gain of said equalizing circuit means is gradually increased with time until said compensation characteristic equals said predetermined compensation characteristic when a predetermined time period elapses.

2. A tracking servo system as claimed in claim 1, wherein said coefficients are an integration coefficient and a second-order term coefficient.

3. A tracking servo system as claimed in claim 1, wherein change amounts of said coefficients per unit time are made constant through said predetermined time period.

4. A tracking servo system as claimed in claim 1, wherein said predetermined time period is divided into a plurality of time periods, and change amounts of said coefficients per unit time are made different among said plurality of time periods.

* * * * *